(12) United States Patent
Tanikawa et al.

(10) Patent No.: US 12,008,823 B2
(45) Date of Patent: Jun. 11, 2024

(54) IMAGE RECOGNIZER AND IMAGE RECOGNITION METHOD

(71) Applicant: DENSO CORPORATION, Kariya (JP)

(72) Inventors: Ukyo Tanikawa, Nisshin (JP); Shunsuke Nakano, Kariya (JP); Takuya Nomura, Kariya (JP); Yasushi Suehisa, Kariya (JP)

(73) Assignee: DENSO CORPORATION, Kariya (JP)

( * ) Notice: Subject to any disclaimer, the term of this patent is extended or adjusted under 35 U.S.C. 154(b) by 153 days.

(21) Appl. No.: 17/333,460

(22) Filed: May 28, 2021

(65) Prior Publication Data

US 2021/0374434 A1 Dec. 2, 2021

(30) Foreign Application Priority Data

Jun. 2, 2020 (JP) .................................. 2020-096060

(51) Int. Cl.
*G06V 20/64* (2022.01)
*G06V 10/25* (2022.01)
(Continued)

(52) U.S. Cl.
CPC ............ *G06V 20/647* (2022.01); *G06V 10/25* (2022.01); *G06V 20/582* (2022.01);
(Continued)

(58) Field of Classification Search
CPC .... G06V 20/647; G06V 10/25; G06V 20/582; G06V 20/584; G06V 20/588; G06V 20/64; G06V 20/56; G06V 40/172; G06V 10/24; G06V 20/54; G06V 20/52; G06V 20/46; G06V 20/58; G08G 1/168; G08G 1/09623; G08G 1/16; G08G 1/167; G08G 1/0145; G08G 1/097; G08G 1/166; G08G 1/00; G08G 1/095; G08G 1/0962; B60R 21/0132; B60R 2300/105; B60R 25/10; B60R 1/00; G06F 18/22; G06F 18/23; G06F 18/241; B60T 2201/022; B60T 2260/08; B60T 8/1755; B60T 2201/08; B60T 2201/081; B60Q 2300/112; B60Q 2300/336; B60Q 9/004; B60Q 2300/114; B60Q 2300/23; B60Q 2300/32; B60Q 2400/50;
(Continued)

(56) References Cited

U.S. PATENT DOCUMENTS

2015/0039202 A1 2/2015 Kido
2016/0318490 A1* 11/2016 Ben Shalom ... B60W 30/18154
(Continued)

FOREIGN PATENT DOCUMENTS

| JP | 2007-034693 A | 2/2007 |
| JP | 2019-003614 A | 1/2019 |
| JP | 2019-075133 A | 5/2019 |

*Primary Examiner* — Nimesh Patel
(74) *Attorney, Agent, or Firm* — MASCHOFF BRENNAN

(57) ABSTRACT

An image recognizer is enabled to appropriately recognize a traffic signal applicable to an own vehicle. A traffic signal detector is configured to detect traffic signals based on an image of a front view of the own vehicle captured from the own vehicle. A calculator is configured to calculate a degree by which a front of the traffic signal faces the own vehicle based on the image. The traffic signal identifier is configured to identify a traffic signal applicable to the own vehicle based on the degree.

5 Claims, 15 Drawing Sheets

(51) Int. Cl.
  *G06V 20/56* (2022.01)
  *G06V 20/58* (2022.01)
(52) U.S. Cl.
  CPC .......... *G06V 20/584* (2022.01); *G06V 20/588* (2022.01); *G06V 20/64* (2022.01)
(58) Field of Classification Search
  CPC . G06T 2207/30236; G06T 2207/30256; G06T 7/00; G06T 7/73
  See application file for complete search history.

(56) References Cited

U.S. PATENT DOCUMENTS

| | | | |
|---|---|---|---|
| 2017/0154528 A1* | 6/2017 | Moritani | G08G 1/096783 |
| 2017/0236414 A1 | 8/2017 | Nishimura | |
| 2018/0253612 A1 | 9/2018 | Koyama et al. | |
| 2019/0080186 A1* | 3/2019 | Zhai | G06V 10/255 |
| 2019/0244041 A1* | 8/2019 | Kawanai | G06V 20/584 |
| 2019/0347940 A1 | 11/2019 | Endo et al. | |
| 2021/0233390 A1* | 7/2021 | Georgiou | G08G 1/04 |
| 2022/0402492 A1* | 12/2022 | Sakakura | B60W 30/165 |

* cited by examiner

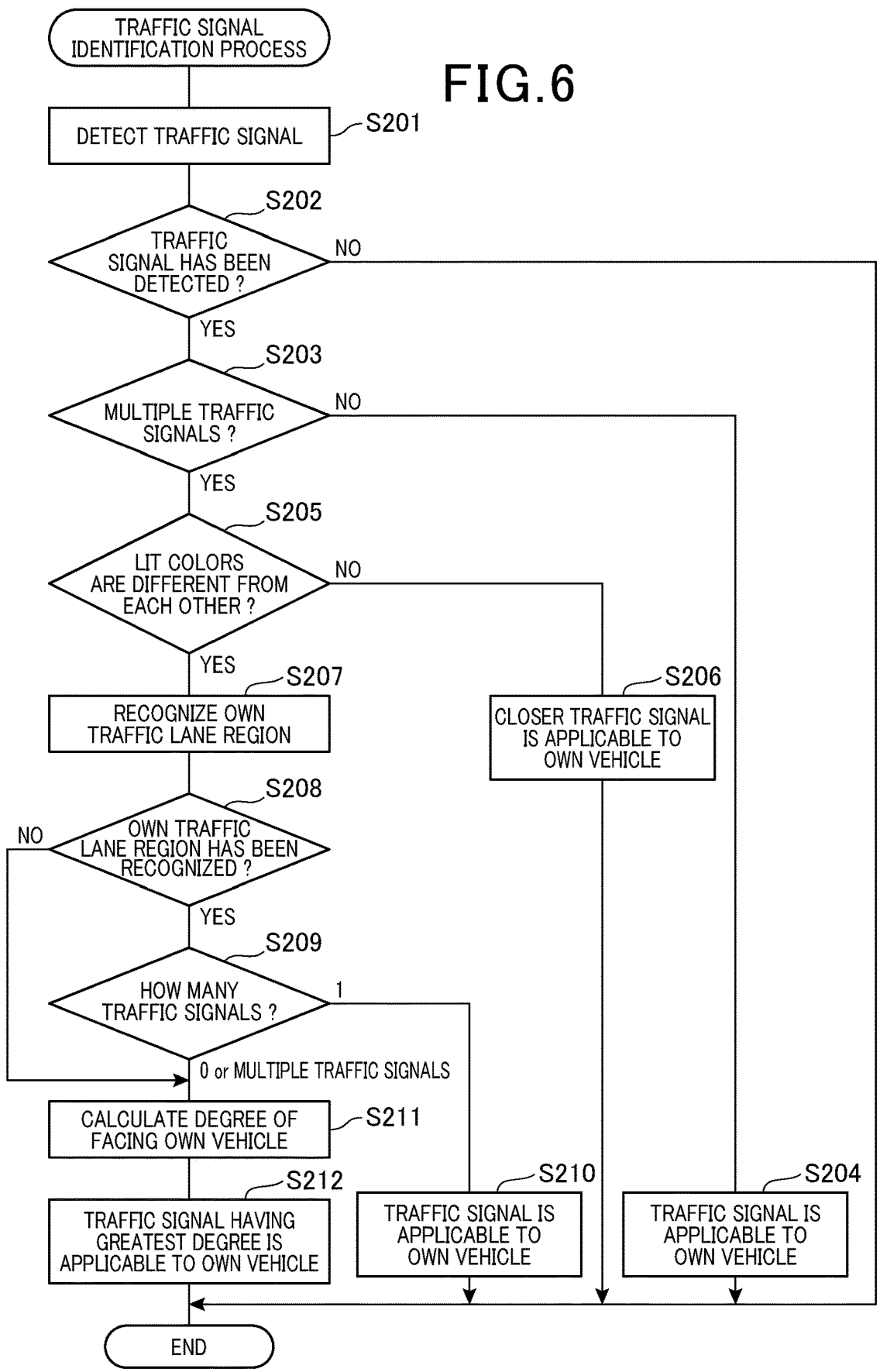

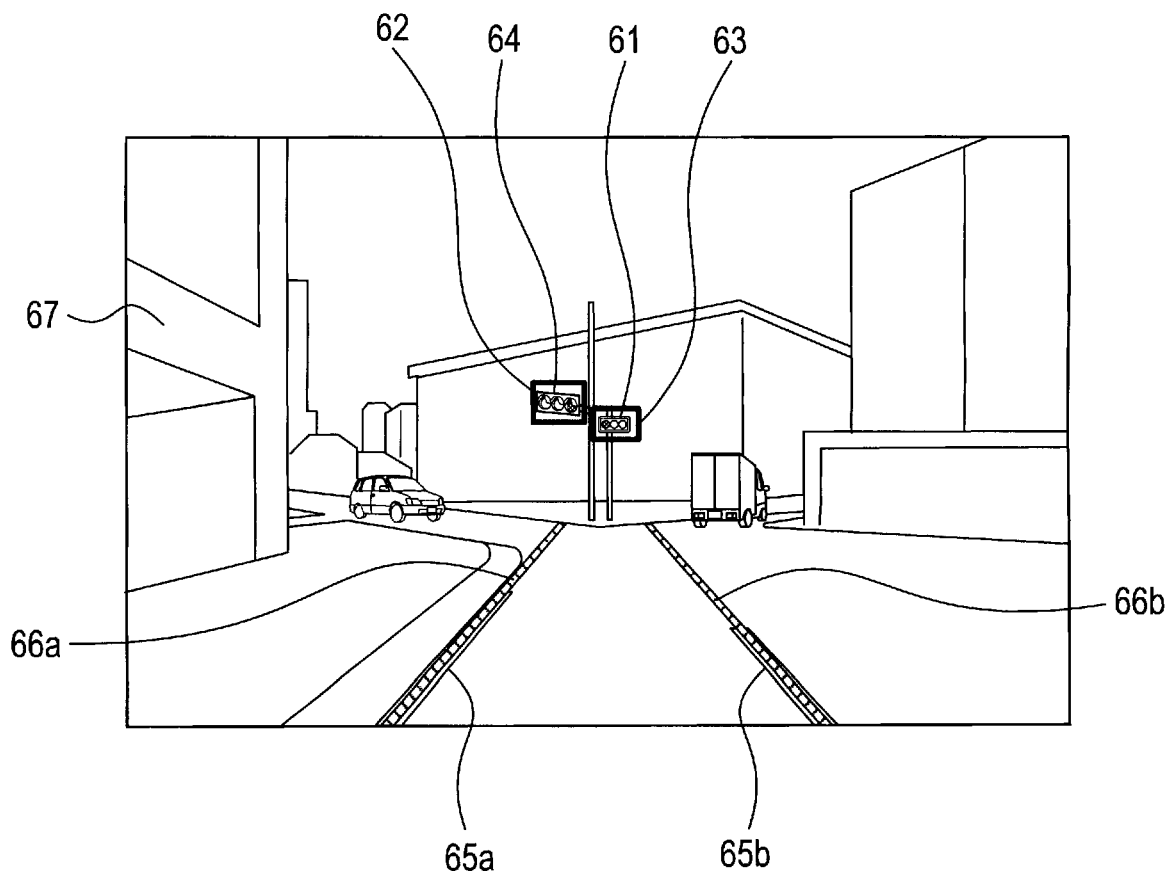

| | RESULT OF DETECTING TRAFFIC SIGNAL | RESULT OF EXTRACTING LIT PORTION | DEGREE OF FACING OWN VEHICLE | |
|---|---|---|---|---|
| LEFT SIDE TRAFFIC SIGNAL 68 | | | 0.71 | |
| RIGHT SIDE TRAFFIC SIGNAL 69 | | | 0.91 | TRAFFIC SIGNAL APPLICABLE TO OWN VEHICLE |

IMAGE RECOGNIZER AND IMAGE RECOGNITION METHOD

CROSS-REFERENCE TO RELATED APPLICATION

This patent application is based on and claims priority to Japanese Patent Application No. 2020-096060, filed on Jun. 2, 2020 in the Japan Patent office, the entire disclosure of which is hereby incorporated by reference herein.

BACKGROUND

Technical Field

This disclosure relates to an image recognizer and image recognition method.

Related Art

A technology is known which detects road markings, traffic signs, and traffic signals based on images captured by an in-vehicle camera. For example, a conventional technology detects traffic signs disposed side by side above a road. Then, information, such as from a traffic sign, etc., detected in this way is used in assisting an own vehicle in driving such that the information is provided to a driver or controls driving of the own vehicle and the like. However, such driving assistance may not be appropriately given to the own vehicle sometimes, in particular, when a traffic sign applicable to another traffic lane other than an own traffic lane in which the own vehicle travels is erroneously recognized to be a traffic sign applicable to the own vehicle, for example.

One aspect of the present disclosure provides a novel image recognizer capable of appropriately recognizing road markings, traffic signs, and traffic signals applicable to an own vehicle.

SUMMARY

Accordingly, one aspect of the present disclosure provides a novel image recognition system that comprises: a traffic signal detector configured to detect a traffic signal based on an image of a region in front of an own vehicle captured from the own vehicle; a calculator configured to calculate a degree by which a front of the traffic signal faces the own vehicle, based on the image; and a traffic signal identifier configured to identify a traffic signal applicable to the own vehicle based on the degree.

Another aspect of the present disclosure provides a novel image recognition system that comprises a traffic sign detector configured to detect traffic signs based on an image of a region in front of an own vehicle captured from the own vehicle; a traffic lane recognizer configured to recognize multiple traffic lanes including at least an own traffic lane in which the own vehicle travels, based on the image; and a traffic lane specifying unit configured to identify a traffic lane closest to the traffic sign among the multiple traffic lanes, based on the image. The image recognition system further comprises a confluence and branch identifier configured to identify whether a traffic lane identified by the traffic lane specifying unit is a traffic lane that merges with the own traffic lane or a traffic lane that branches off from the own traffic lane; and a determiner configured to determine whether the traffic sign is applicable to the own vehicle. Further, the determiner determines that the traffic sign is not applicable to the own vehicle when the traffic lane identified by the traffic lane specifying unit is identified as a traffic lane that merges with the own traffic lane or as a traffic lane that branches off from the own traffic lane.

Another aspect of the present disclosure provides a novel image recognition system that comprises a road marking detector configured to detect a road marking based on an image of a region in front of an own vehicle captured from the own vehicle; a demarcation line recognizer configured to recognize a pair of demarcation lines that define a traffic lane based on the image, and a corresponding point specifying unit configured to identify a pair of corresponding points on the pair of respective demarcation lines corresponding to a position of the road marking in a longitudinal direction of the own vehicle. The image recognition system further comprises an estimator to estimate that a traffic lane specified by the pair of demarcation lines to which the pair of corresponding points belong is a traffic lane to which the road marking is applied, when the road marking is located between the pair of corresponding points in the widthwise direction of the own vehicle.

BRIEF DESCRIPTION OF THE DRAWINGS

A more complete appreciation of the present disclosure and many of the attendant advantages of the present disclosure will be more readily obtained as substantially the same becomes better understood by reference to the following detailed description when considered in connection with the accompanying drawings, wherein:

FIG. 6 is a flowchart illustrating an exemplary traffic signal identification process performed according to the second embodiment of the present disclosure;

FIG. 7 illustrates a situation in which two traffic signals are detected in an own traffic lane region according to the second embodiment of the present disclosure;

FIG. 8 is a diagram illustrating an exemplary identification result of identifying one of the traffic signals in the situation shown in FIG. 7 according to the second embodiment of the present disclosure;

DETAILED DESCRIPTION

Figure 1:
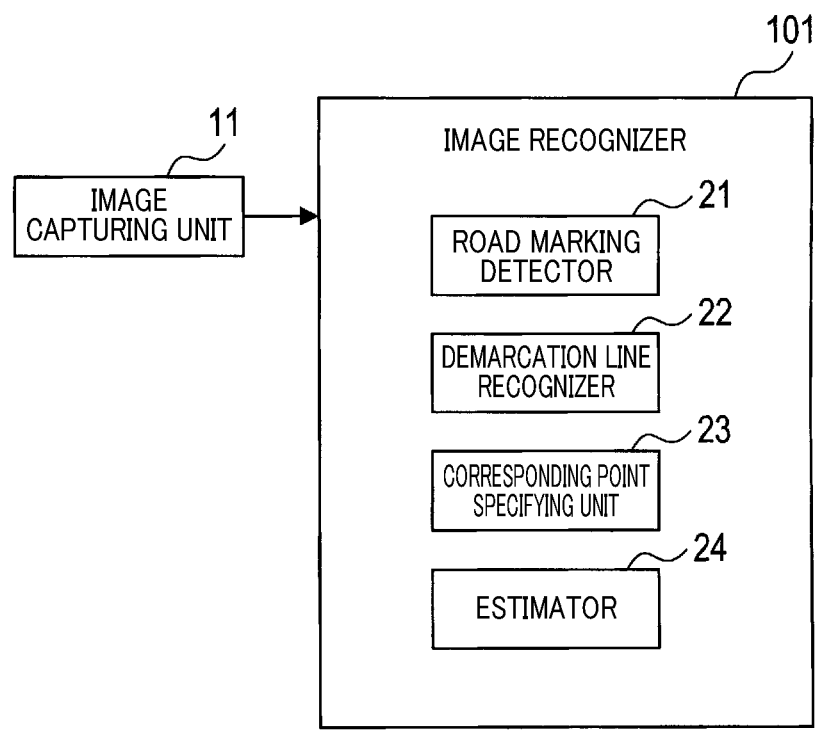
FIG. 1 is a block diagram illustrating a configuration of an exemplary image recognizer according to a first embodiment of the present disclosure.

Referring now to the drawings, wherein like reference numerals designate identical or corresponding parts throughout the several views thereof, and to FIG. 1, an exemplary configuration of a first embodiment of the present disclosure will be initially described. As shown in FIG. 1, an image recognizer 101 is mounted on a vehicle, such as a car, etc., and detects a road marking based on an image input from an image capturing unit 11 also mounted on the vehicle. The image recognizer 101 then estimates a traffic lane to which the detected road marking is applied. Hereinafter, a vehicle equipped with the image recognizer 101 is premised as an own vehicle.

The image capturing unit 11 is mounted on the vehicle, for example, at a center of a front side thereof, and is composed of a camera system that captures an image of a scene ahead of the own vehicle at prescribed intervals. Specifically, the image capturing unit 11 employs a monocular camera. The image capturing unit 11 captures and outputs an image (hereinafter referred to as a captured image) to the image recognizer 101.

The image recognizer 101 is mainly composed of a microcomputer that includes a CPU (Central Processing Unit), a semiconductor memory, such as a RAM (Random Access Memory), a ROM (Read Only Memory), etc., and an I/O (Input Output Port). The microcomputer also includes a bus line connecting these devices with each other.

The road marking detector 21 is enabled to detect the road marking based on the captured image. As shown in FIG. 1, the image recognizer 101 includes a road marking detector 21, a demarcation line recognizer 22, and a corresponding point specifying unit 23 as respective functional blocks. The image recognizer 101 also includes an estimator 24 as another functional block. These functional blocks are realized by the CPU when the CPU runs programs stored in the semiconductor memory. Here, the "marking" is drawn on a road surface or around a road to indicate information relevant to traffic. In this embodiment, as the road marking, the road marking detector 21 detects a road marking drawn on a road surface for the purpose of indicating information to a specific traffic lane. The road marking detector 21 detects road markings by using a model constructed by machine learning. When a road marking is detected, the road marking detector 21 places a rectangular detection frame on a captured image, which surrounds a portion where the road marking is present.

At the same time, the road marking detector 21 calculates a coordinate of the road marking as detected in a world coordinate system having three axes respectively extended in a widthwise direction of an own vehicle, a car height direction of the own vehicle, and a longitudinal direction relative to the own vehicle. The coordinates in the world coordinate system are estimated by using a moving stereo method that employs a monocular camera. Specifically, the method estimates a three-dimensional position of an object by associating characteristic points of two-dimensional captured images obtained from the object at different positions by moving an own vehicle with each other while calculating an amount of motion of the own vehicle, thereby applying a triangulation principle thereto.

The demarcation line recognizer 22 is configured to recognize a pair of demarcation lines that define a traffic lane on a road based on a captured image. The demarcation line recognizer 22 recognizes the pair of demarcation lines by detecting a line drawn on the road by using a model constructed by machine learning. Further, like the road marking detector 21, the demarcation line recognizer 22 calculates coordinates of the pair of demarcation lines as recognized in the world coordinate system.

The corresponding point specifying unit 23 is configured to identify a pair of corresponding points on a pair of respective demarcation lines corresponding to a position of the road marking in the longitudinal direction based on a detection result generated by the road marking detector 21 and a recognition result generated by the demarcation line recognizer 22. An exemplary method of identifying the pair of corresponding points will be detailed later more in detail.

The estimator 24 is configured to estimate a traffic lane to which a road marking detected by the road marking detector 21 is applied. An exemplary estimation method of estimating the applicable traffic lane will be detailed later more in detail. Next, an applicable traffic lane estimation process performed by the image recognizer 101 will be described herein below with reference to a flowchart of FIG. 2. The applicable traffic lane estimation process is performed every time a captured image is input to the image recognizer 101 from the image capturing unit 11.

First, in step S101, the image recognizer 101 performs a detection process of detecting a road marking in the captured image as described earlier. For example, in a captured image shown in FIG. 3, a road marking 51 drawn on an own traffic lane and a road marking 52 drawn on an adjacent traffic lane adjacent to a right side of the own traffic lane are detected, and respective detection frames 53 and 54 surrounding the road markings 51 and 52 are indicated.

Subsequently, in step S102, the image recognizer 101 determines whether the road marking has been detected in step S101. When the image recognizer 101 determines that no marking has been detected in step S102 (No, in step S102), the image recognizer 101 terminates the applicable traffic lane estimation process of FIG. 2.

Figure 3:
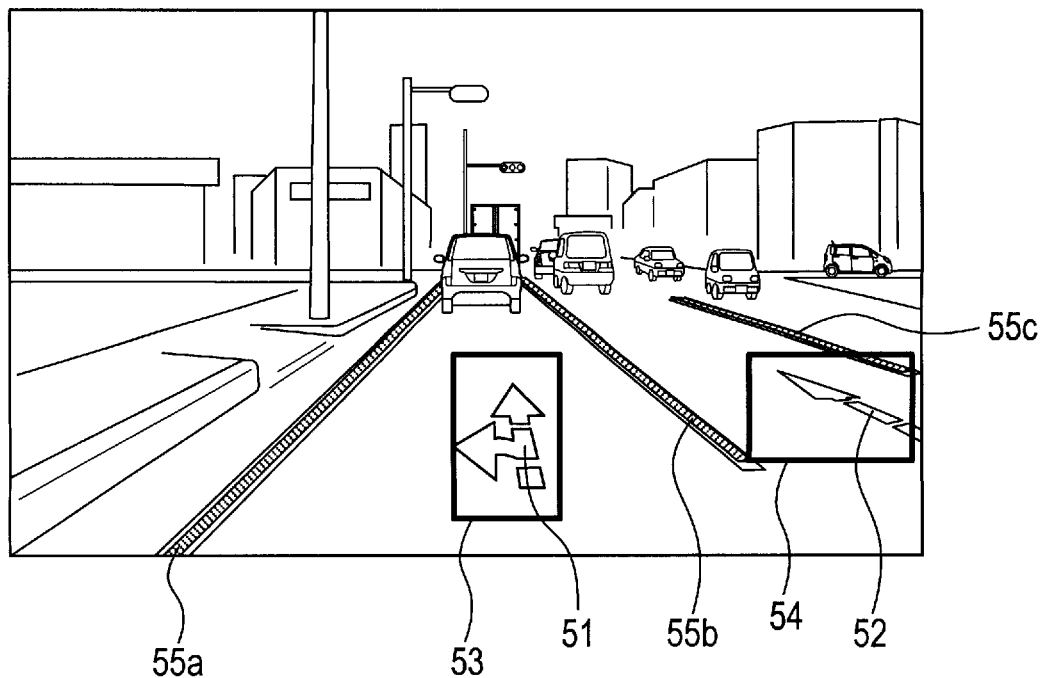
FIG. 3 is a diagram illustrating an exemplary detection result of detecting a road marking and an exemplary recognition result of recognizing a traffic lane in a prescribed situation according to the first embodiment of the present disclosure.

By contrast, when the image recognizer 101 determines that a road marking has been detected in step S102 (Yes, in step S102), the process proceeds to step S103 and the image recognizer 101 performs a recognition process of recognizing a pair of demarcation lines that define a traffic lane as described earlier. Specifically, the image recognizer 101 recognizes a pair of demarcation lines that define an own traffic lane. The image recognizer 101 also recognizes each of two pairs of demarcation lines that define each of left and right adjacent traffic lanes arranged adjacent to the own traffic lane, when these left and right adjacent traffic lanes are included. For example, as shown in FIG. 3, a pair of demarcation lines 55a and 55b are recognized in the captured image as a pair of demarcation lines defining the own traffic lane. At the same time, a pair of demarcation lines 55b and 55c are recognized in the captured image as a pair of demarcation lines defining the adjacent traffic lane arranged adjacent to a right side of the own traffic lane. Here, when only one demarcation line of a pair of demarcation lines have been detected on a road, for example, due to aging of the other demarcation line thereof, the image recognizer 101 recognizes the pair of demarcation lines by assuming a width of the pair of traffic lane lanes and thereby estimating the other demarcation line.

Subsequently, in step S104, the image recognizer 101 determines whether the pair of demarcation line that define the own traffic lane has been recognized. When the image recognizer 101 determines that the pair of demarcation lines defining the own traffic lane cannot be recognized in step S104 (No, in step S104), the process proceeds to step S105 and the image recognizer 101 determines that no estimation result is obtained.

Figure 4:
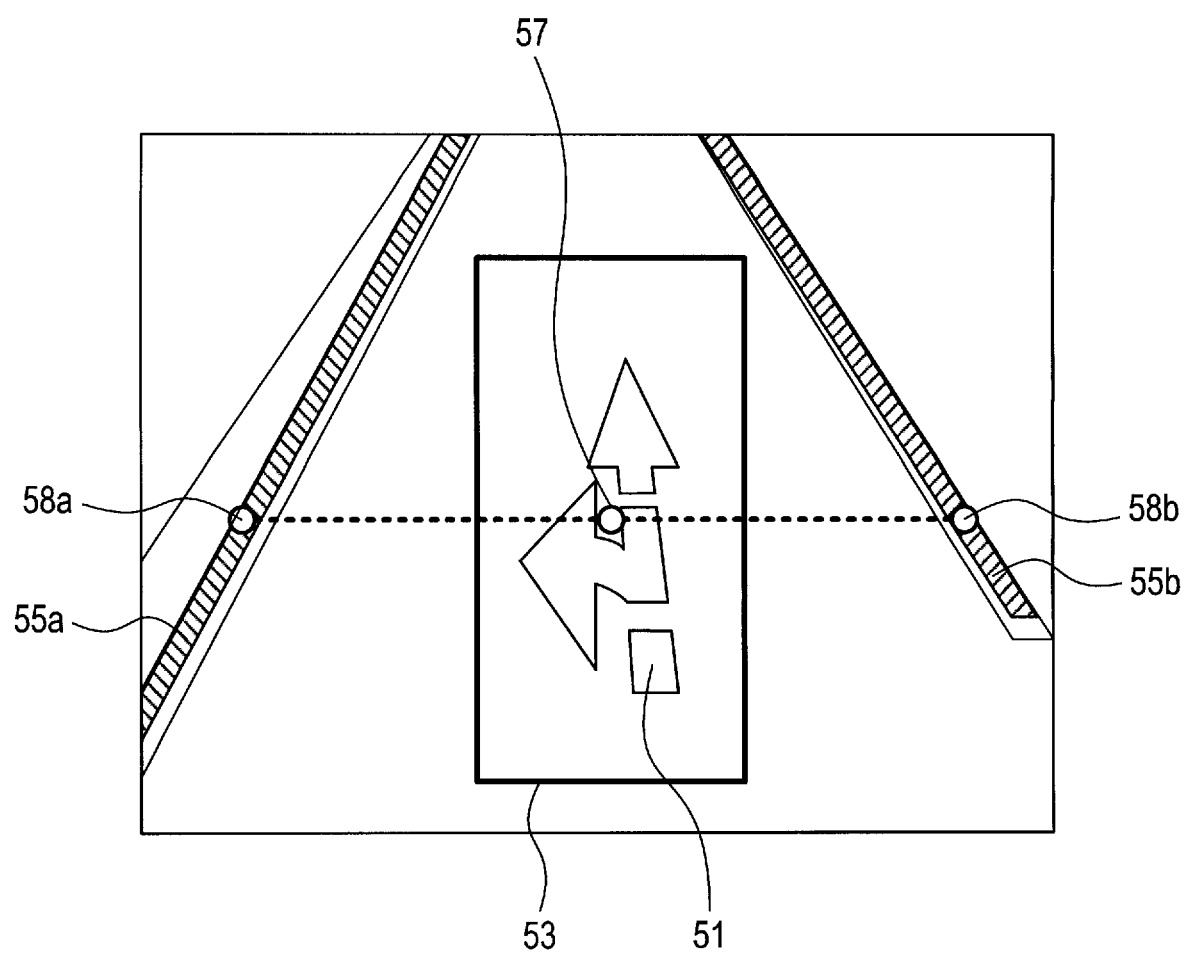
FIG. 4 is a diagram illustrating an exemplary method of comparing a coordinate of a road marking with a coordinate of a demarcation line according to the first embodiment of the present disclosure.

By contrast, when the image recognizer 101 determines that the pair of demarcation lines defining the own traffic lane have been recognized in step S104 (Yes, in step S104), the process proceeds to step S106. Then, in step S106, the image recognizer 101 identifies a pair of corresponding points on the pair of demarcation lines corresponding to a position of the road marking as detected in the longitudinal direction. Specifically, as shown in FIG. 4, among points on each of the pair of demarcation lines 55a and 55b collectively defining the own traffic lane, respective points closest to a center of gravity 57 of the detection frame 53 of the road marking 51 along the longitudinal direction, for example, are identified as a pair of corresponding points 58a and 58b.

Subsequently, in step S107, the image recognizer 101 estimates a traffic lane to which a road marking is applied, by comparing a coordinate of the road marking with coordinates of a pair of respective corresponding points. Specifically, the image recognizer 101 estimates that a traffic lane specified by the pair of demarcation lines to which the corresponding points belong, respectively, is a traffic lane to which the road marking is applied, when the road marking is present between the pair of corresponding points in the widthwise direction of the own vehicle. For example, in the captured image shown in FIG. 4, since a coordinate of the center of gravity 57 of the road marking 51 is present between the pair of corresponding points 58a and 58b on the pair of respective demarcation lines 55a and 55b collectively defining the traffic lane of the own vehicle in the widthwise direction, it is assumed that the traffic lane to which the road marking 51 is applied corresponds to the own traffic lane.

Figure 2:
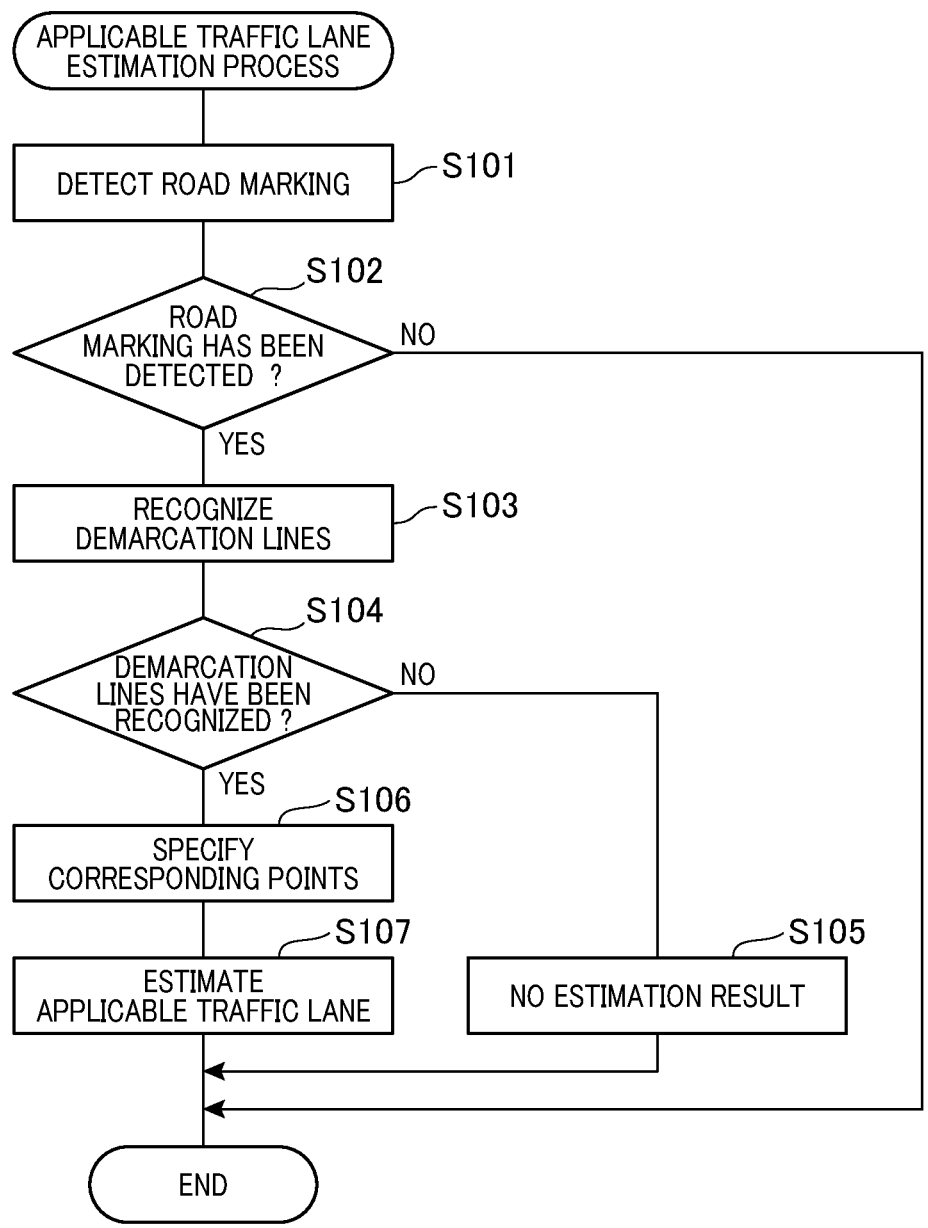
FIG. 2 is a flowchart illustrating an exemplary estimation process of estimating an applicable traffic lane performed according to the first embodiment of the present disclosure.

Subsequently, the image recognizer 101 ends the applicable traffic lane estimation process of FIG. 2. Hence, as described heretofore, according to the first embodiment of the present disclosure, the advantages below described can be obtained.

First, the image recognizer 10 identifies the pair of corresponding points on the pair of respective demarcation lines corresponding to the position of the road marking in the longitudinal direction of the own vehicle based on the captured image. Then, the image recognizer 101 estimates that the traffic lane defined by the pair of demarcation lines to which the corresponding points belong, respectively, is the traffic lane to which the road marking is applied, when the road marking is present between the pair of corresponding points in the widthwise direction of the own vehicle.

That is, the image recognizer 101 is not a device that compares a coordinate of a road marking with coordinates of a pair of demarcation lines on a captured image defined by a two-dimensional coordinate system, but is a device that compares the coordinate of the road marking with the pair of demarcation lines in the world coordinate system, which is a three-dimensional coordinate system. Hence, a traffic lane to which the road marking is applied can be accurately estimated.

Secondly, the image recognizer 101 identifies the points closest to the road marking in the longitudinal direction as the pair of corresponding points among the points that constitute the pair of demarcation lines. According to such a configuration, since points present nearly right beside the road marking on the pair of demarcation lines are identified as the pair of corresponding points, the traffic lane to which the road marking is applied can be accurately estimated.

Here, in the first embodiment, the process performed in step S101 corresponds to the process performed by the road marking detector 21. The process performed in S103 corresponds to the process performed by the demarcation line recognizer 22. The process performed in S106 corresponds to the process performed by the corresponding point specifying unit 23. Further, the process performed in S107 corresponds to the process performed by the estimator 24.

Next, a second embodiment of the present disclosure will be herein below described with reference to FIG. 5 and applicable drawings. First, an exemplary configuration of the second embodiment is described. In the second embodiment, descriptions of respective configurations having the same reference numerals as the first embodiment are herein below incorporated by reference herein.

Figure 5:
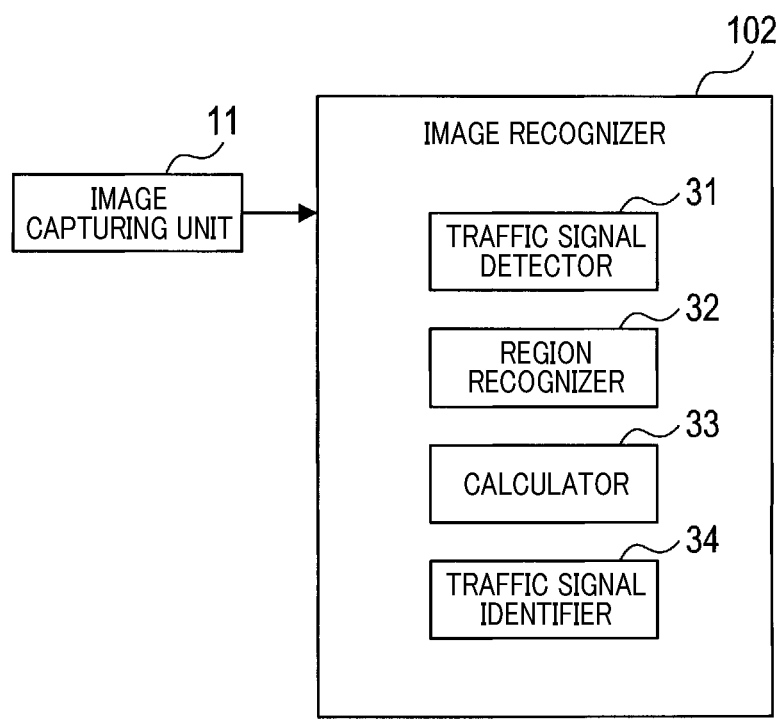
FIG. 5 is a block diagram illustrating a configuration of another exemplary image recognizer according to a second embodiment of the present disclosure.

Specifically, as shown in FIG. 5, the image recognizer 102 is mounted on the vehicle and detects traffic signals based on a captured image input from an image capturing unit 11 mounted on a vehicle. The image recognizer 102 also identifies a traffic signal applicable to the own vehicle (hereinafter sometimes referred to as a traffic signal intended for the own vehicle).

The image recognizer 102 includes a traffic signal detector 31, a region recognizer 32, and a calculator 33 serving as respective function blocks. The image recognizer 102 also includes a traffic signal identifier 34 as a function block. These function blocks are realized when the CPU executes program stored in the semiconductor memory.

The traffic signal detector 31 is configured to detect a traffic signal based on the captured image and identifies a lit color thereof. Specifically, first, the traffic signal detector 31 detects the traffic signal by using a model constructed by machine learning. When the traffic signal is detected, the traffic signal detector 31 provides a rectangular detection frame surrounding a portion where the traffic signal is present on the captured image. Then, the traffic signal detector 31 detects a portion where the traffic signal is lit (hereinafter simply referred to as a lit portion). Such a lit portion is detected by recognizing a certain region of the detection frame where each of a hue, a saturation, and a brightness exceeds a prescribed threshold predetermined per lit color, such as red, blue, yellow, etc.

At the same time, the traffic signal detector 31 calculates coordinates of each of the traffic signal and the lit portion as detected in the above-described world coordinate system. The region recognizer 32 is configured to recognize an own traffic lane region, which is a region corresponding to the own traffic lane based on the captured image. Specifically, the region recognizer 32 recognizes a pair of demarcation lines in the captured image, which define the own traffic lane by using a model constructed by machine learning. The region recognizer 32 then finds a space on the own vehicle traffic lane as the own traffic lane region in the world coordinate system. Details of an exemplary method of finding the own traffic lane region will be described later.

The calculator 33 is configured to calculate a degree by which a front of the traffic signal detected by the traffic signal detector 31 faces the own vehicle (hereinafter simply referred to as an own vehicle facing degree) based on the captured image. An exemplary calculation method of calculating the own vehicle direction degree will be described later in more detail.

The traffic signal identifier 34 is enabled to identify a traffic signal applicable to the own vehicle based on a detection result generated by the traffic signal detector 31, a recognition result generated by the region recognizer 32, and a calculation result generated by the calculator 33. An exemplary identification method of identifying the traffic signal applicable to the own vehicle will also be described later in detail. Next, an exemplary traffic signal identification process performed by the image recognizer 102 will be herein below described with reference to a flowchart of FIG. 6. Here, the image recognizer 102 performs the traffic signal identification process every time the image capturing unit 11 inputs a captured image thereto.

First, in step S201, the image recognizer 102 performs the traffic signal detection process based on the captured image as described earlier. For example, in the captured image shown in FIG. 7, two traffic signals 61 and 62 are detected, and detection frames 63 and 64 surrounding the traffic signals 61 and 62 respectively are provided thereto.

Subsequently, in step S202, the image recognizer 102 determines whether a traffic signal has been detected in step S201. When the image recognizer 102 determines that the traffic signal is not detected in step S202 (No, in step S202), the image recognizer 102 terminates the traffic signal identification process of FIG. 6.

By contrast, when the image recognizer 102 determines that the traffic signal has been detected in step S202 (Yes, in step S202), the process proceeds to step S203 and the image recognizer 102 determines whether multiple traffic signals have been detected. When the image recognizer 102 determines that multiple traffic signals have not been detected (No, in step S203), that is, only one traffic signal has been detected, the process proceeds to step S204 and the image recognizer 102 determines that the traffic signal is applicable to the own vehicle.

By contrast, when the image recognizer 102 determines that the multiple traffic signals have been detected in step S203 (Yes, in step S203), the process proceeds to step S205 and the image recognizer 102 determines whether lit colors of respective traffic signals are different from each other. When the image recognizer 102 determines that lit colors of the respective traffic signals are substantially the same with each other in step S205 (Yes, in step S205), the process proceeds to step S206 and the image recognizer 102 determines that the traffic signal closest to the own vehicle is applicable to the own vehicle. That is, when more than one traffic signal with the same lit color is detected, since it is assumed highly likely that multiple traffic signals are present to perform the same operation on a one-way road with many traffic lanes, the image recognizer 102 determines that these traffic signals are applicable to the own vehicle. However, if multiple intersections are consecutively disposed at a short distance in a travelling direction of the own vehicle, both a traffic signal placed at a nearer intersection and a traffic signal placed at a further intersection are highly likely to be detected at the same time. Hence, the image recognizer 102 determines that the traffic signal closest to the own vehicle in the longitudinal direction in the world coordinate system is applicable to the own vehicle.

By contrast, when the image recognizer 102 determines that the lit colors of the respective traffic signals are different from each other in step S205 (Yes, in step S205), the process proceeds to step S207 and the image recognizer 102 performs a recognition process of recognizing the own traffic lane region. Specifically, as shown in FIG. 7, the image recognizer 102 recognizes a pair of demarcation lines 65*a* and 65*b* that define the own traffic lane in the world coordinate system, and finds a pair of extension lines 66*a* and 66*b* respectively extended along the pair of demarcation lines 65*a* and 65*b* in a longitudinal direction. Then, the image recognizer 102 recognizes a space on a traffic lane region sandwiched by the pair of demarcation lines as the own traffic lane region.

Subsequently, in step S208, the image recognizer 102 determines whether the own traffic lane region can be recognized. For example, in a captured image shown in FIG. 9, since a pair of demarcation lines defining the own traffic lane is outside an angle of view and is not detected, the image recognizer 102 determines that the own traffic lane region has not been recognized.

When the image recognizer 102 has determined that the own traffic lane region can be recognized as a result of determination in step S208 (Yes, in step S208), the process proceeds to step S209 and the image recognizer 102 determines whether the number of traffic signals placed in the own traffic lane region is either zero or two or more. Determination of whether each of the traffic signals is placed in the own traffic lane region is similarly performed as performed in steps S106 and S107 of the first embodiment. Specifically, the image recognizer 102 specifies closest points as a pair of corresponding points closest to a center of gravity of the traffic signal detection frame along the longitudinal direction among points constituting the pair of respective extension lines (66*a* and 66*b*). Then, the image recognizer 103 determines whether the traffic signal is placed in the own traffic lane region depending on whether the center of gravity of the detection frame of the traffic signal is present between coordinates of the pair of respective corresponding points in the widthwise direction of the own vehicle.

Hence, by determining whether each of the traffic signals is placed in the own traffic lane region in this way, the number of traffic signals placed in the own traffic lane region is obtained. As a result, when the image recognizer 102 determines in step S209 that the number of traffic signals in the own traffic lane region is only one, the process proceeds to step S210 and the image recognizer 102 determines that the only one traffic signal is applicable to the own vehicle. By contrast, when the image recognizer 102 determines in step S209 that the number of traffic signals placed in the own traffic lane region is either zero or two or more, the process proceeds to S211.

By contrast, in step S208, when the image recognizer 102 determines that the image recognizer 102 has not recognized the own traffic lane region (No, in step 208), the process proceeds to step S211 by skipping step S209. In step S211, the image recognizer 102 calculates a facing degree of each of the traffic signals facing the own vehicle in the own traffic lane region. Specifically, as shown in FIG. 8, the image recognizer 102 applies a binarization process to a region of a detection frame of each of the traffic signals, thereby separating the region of the detection frame into a lit portion and other portion other than the lit portion in each of the traffic signals. Then, the image recognizer 102 extracts each of the lit portions therefrom. Then, the image recognizer 102 calculates a co-dispersion matrix based on coordinates of pixels constituting the lit portion, thereby calculating two unique values. Here, of the two unique values, the larger one is herein below referred to as a first unique value and the smaller one is as a second unique value, respectively. Then, a ratio of the second unique value to the first unique value is calculated and obtained as a facing degree by which a traffic signal faces the own vehicle. This ratio represents a ratio of a length of a minor axis of an ellipse to a length of a long axis thereof when a form of the lit portion approximates an ellipse. That is, when a front of the traffic signal is just facing a front of the own vehicle, since the lit portion forms a circle, the above-described ratio is numerically one. Hence, it is estimated that the closer the ratio to one, the closer the shape of the lit portion to a circle and the higher the facing degree by which the front of the traffic signal faces the own vehicle.

Figures 9, 10:
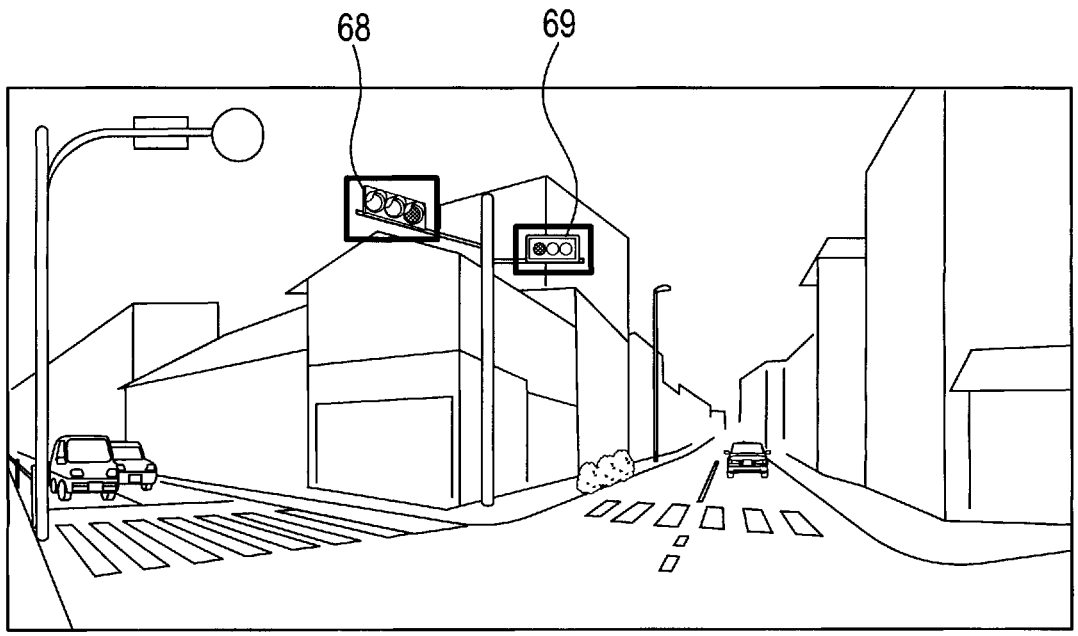
FIG. 9 is a diagram illustrating a situation where an own traffic lane region cannot be recognized according to the second embodiment of the present disclosure.
FIG. 10 is a diagram illustrating an identification result of identifying a traffic signal in the situation shown in FIG. 9 according to the second embodiment of the present disclosure.

Hence, in step S212, the image recognizer 102 determines that a traffic signal facing the own vehicle with the greatest facing degree among these multiple traffic signals is applicable to the own vehicle. For example, in the captured image shown in FIG. 7, a traffic signal 61 located right is applicable to the own vehicle, and the traffic signal 62 located left is applicable to another vehicle running on a road behind a building 67 facing a left side of the own vehicle. In such a situation, a facing degree of the right traffic signal 61 facing the own vehicle is greater than a facing degree of the left traffic signal 62 facing the own vehicle. Hence, it is accurately determined as is that the right traffic signal 61 is applicable to the own vehicle. Further, in another example of a captured image shown in FIG. 9, a traffic signal 68 located left is applicable to another vehicle running on a road that intersects with the own traffic lane, and a traffic signal 69 located right is applicable to the own vehicle. In such a situation, as shown in FIG. 10, the facing degree of the right traffic signal 69 facing the own vehicle is greater than the facing degree of the left traffic signal 68 facing the own vehicle. Hence, it is again accurately determined as is that the right traffic signal 69 is applicable to the own vehicle.

Subsequently, the image recognizer 102 terminates the traffic signal identification process of FIG. 6. Hence, as described heretofore, according to the second embodiment of the present disclosure, the below described advantages can be partially or wholly obtained.

That is, the image recognizer 102 is configured to calculate the facing degree of the traffic signal facing the own vehicle based on the captured image and identifies the traffic signal applicable to the own vehicle based on the facing degree thereof facing the own vehicle. Specifically, the image recognizer 102 identifies the traffic signal with the highest facing degree of facing the own vehicle among the number of traffic signals and determines that the traffic signal as identified is applicable to the own vehicle.

Here, the traffic signal is usually placed to face a vehicle to which the traffic signal intends to direct. Hence, when viewed from the own vehicle, a traffic signal applicable to the own vehicle seems to be directly opposite to the own vehicle. By contrast, a traffic signal that is not applicable to the own vehicle, for example, a traffic signal placed on another road that intersects a road of the own traffic lane seems to be in an oblique state. Hence, by using the facing degree by which the front of the traffic signal is facing the own vehicle like the above-described configuration, the traffic signal applicable to the own vehicle can be appropriately identified.

Further, the image recognizer 102 identifies the traffic signal facing the own vehicle based on the own vehicle facing degree on condition that the number of traffic signals present in the own traffic lane region is either zero or two or more as described earlier. That is, if the number of traffic signals present in the own traffic lane region is neither zero nor two or more, but is only one, the only one traffic signal is highly likely to be applicable to the own vehicle. Hence, in such a situation, the traffic signal identification process can be accelerated by omitting the calculation of calculating the facing degree of facing the own vehicle.

Further, the image recognizer 102 identifies the traffic signal applicable to the own vehicle based on the facing degree of facing the own vehicle on condition that lit colors of multiple traffic signals are different from each other as described earlier. By contrast, when the lit colors of the multiple traffic signals are substantially the same with each other, it is assumed that these multiple traffic signals that perform substantially the same operation are present in a one-way road with many traffic lanes. Hence, these multiple traffic signals as detected are highly likely to be applicable to the own vehicle. Hence, in such a situation, the traffic signal identification process can be accelerated by omitting the calculation of calculating the facing degree of the traffic signal facing the own vehicle.

Hence, in the second embodiment of the present disclosure, the process performed in step S201 corresponds to the process performed by the traffic signal detector 31. The process performed in step S207 corresponds to the process performed by the region recognizer 32. The process performed in step S211 corresponds to the process performed by the calculator 33. Further, respective processes performed in steps S204, S210, and S212 correspond to the processes performed by the traffic signal identifier 34.

Next, a third embodiment of the present disclosure will be herein below described with reference to FIG. 11 and applicable drawings. First, an exemplary configuration of the third embodiment is described. Since the third embodiment has the same fundamental configuration as the first embodiment, only differences therefrom will be described hereinbelow. Further, the same reference numeral used in the third embodiment indicates the same configuration as used in the first embodiment and description thereof is hereby incorporated by reference herein.

Figure 11:
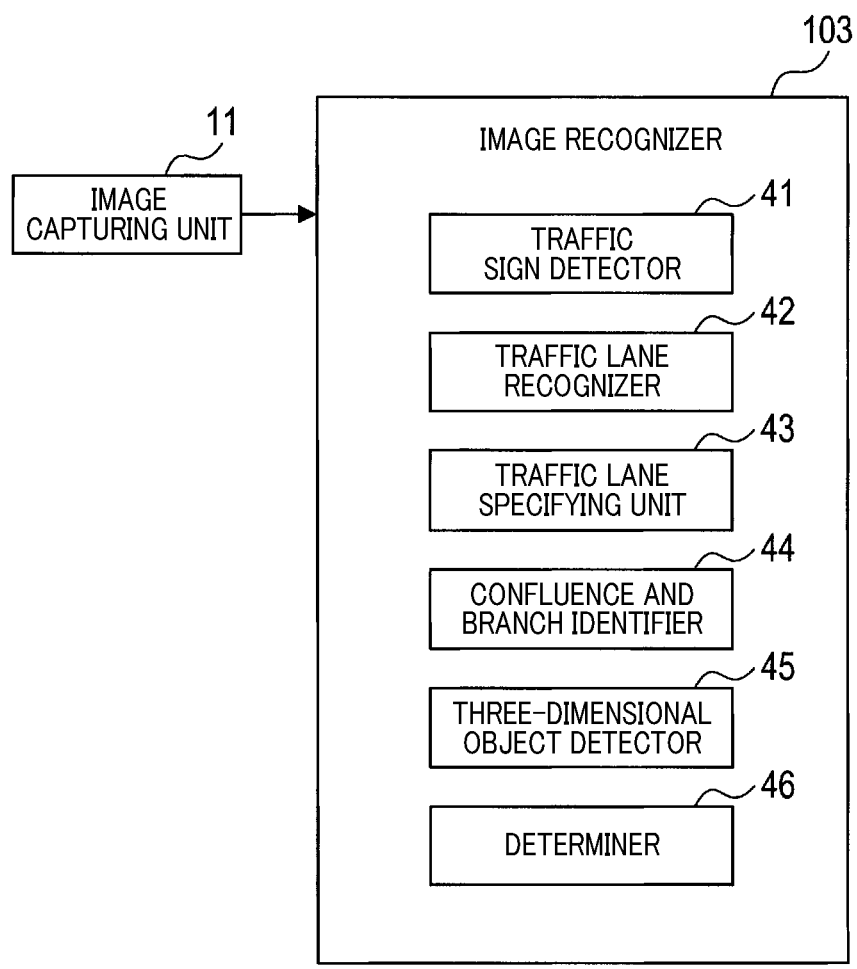
FIG. 11 is a block diagram illustrating an exemplary configuration of a yet another image recognizer according to a third embodiment of the present disclosure.

An image recognizer 103 shown in FIG. 11 is a device mounted on a vehicle to detect a traffic sign based on a captured image input thereto from the image capturing unit 11 also mounted on the vehicle. The image recognizer 103 then determines whether the traffic sign as detected is applicable to the own vehicle.

The image recognizer 103 includes a traffic sign detector 41, a traffic lane recognizer 42, and a traffic lane identifier 43 as respective function blocks. The image recognizer 103 also includes a confluence and branch identifier 44, a three-dimensional object detector 45, and a determiner 46 as respective function blocks. These function blocks are realized by the CPU (Central Processing Unit) executing program stored in the semiconductor memory.

The traffic sign detector 41 is configured to detect the traffic signs based on the captured image. Specifically, the traffic sign detector 41 detects the traffic signs by using a model constructed by machine learning and finds coordinates of the traffic sign as detected in the world coordinate system as described earlier. Further, when the traffic sign is detected, the traffic sign detector 41 provides a rectangular detection frame surrounding a portion where the traffic sign exists on the captured image.

The traffic lane recognizer 42 is configured to recognize at least two traffic lanes including an own traffic lane based on the captured image. Specifically, the traffic lane recognizer 42 detects demarcation lines drawn on a road to which the own traffic lane belongs by using a model constructed by machine learning. The traffic lane recognizer 42 then recognizes the multiple traffic lanes divided by the demarcation lines as detected. The traffic lane recognizer 42 then calculates coordinates of each of the multiple traffic lanes as recognized in the world coordinate system as described earlier.

The traffic lane specifying unit 43 is configured to identify a traffic lane closest to the traffic sign detected by the traffic sign detector 41 among these multiple traffic lanes recognized by the traffic lane recognizer 42 based on the captured image. An exemplary method of identifying the traffic lane closest to the traffic sign will be detailed later.

The confluence and branch identifier 44 is configured to identify whether a traffic lane identified by the traffic lane specifying unit 43 merges with or branches from the own traffic lane. An exemplary method of identifying such a traffic lane will also be detailed later.

The three-dimensional object detector 45 is configured to detect a three-dimensional object representing an edge of a road to which the multiple traffic lanes recognized by the traffic lane recognizer 42 belong. The three-dimensional object includes a curb, a block, a fence, a sound insulation wall, a guardrail, a central separation strip and the like, for example. The three-dimensional object detector 45 detects the three-dimensional object by using a model constructed by machine learning, and finds coordinates thereof in the world coordinate system as described earlier. An exemplary detection method of detecting the three-dimensional object will also be described later in detail.

Further, the determiner 46 is configured to determine whether the traffic sign detected by the traffic sign detector 41 is applicable to the own vehicle. An exemplary determination method will also be detailed later. Next, an exemplary traffic sign determination process performed by the image recognizer 103 will be described herein below with reference to a flowchart of FIG. 12. The traffic sign determination process is performed every time the image capturing unit 11 inputs a captured image to the image recognizer 103.

First, in step S301, the image recognizer 103 detects the traffic sign based on the captured image as described earlier. For example, in a captured image shown in FIG. 13, a traffic sign 71 indicating the maximum speed is detected, and a detection frame 72 surrounding the traffic sign 71 is then provided therein.

Figure 12:
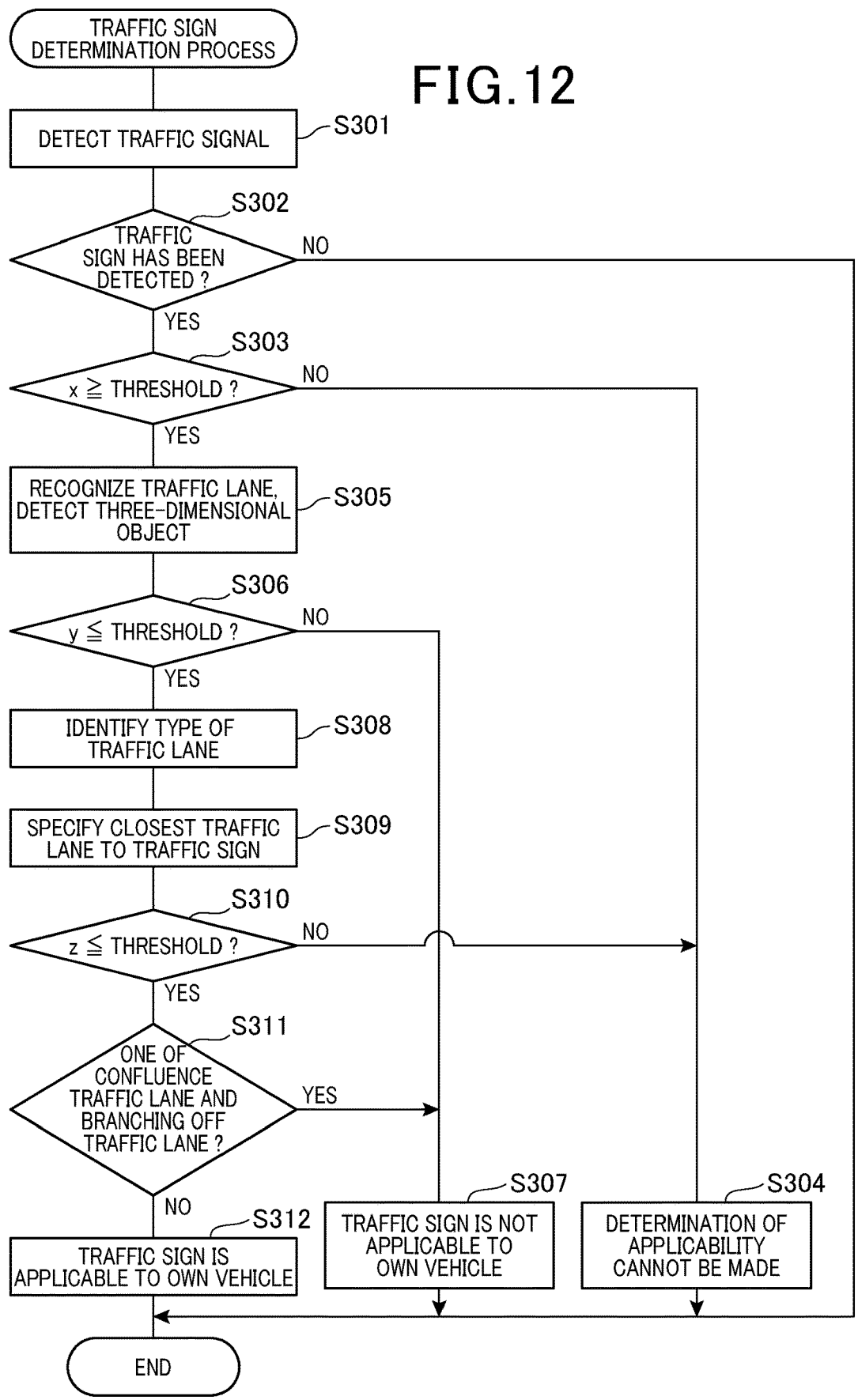
FIG. 12 is a flowchart illustrating an exemplary traffic sign determination process performed according to the third embodiment of the present disclosure.

Subsequently, in step S302, the image recognizer 103 determines whether the traffic sign has been detected as a result of determination in step S301. When the image recognizer 103 determines that the traffic sign has not been detected in step S302 (No, in step S302), the traffic sign determination process of FIG. 12 is terminated.

Figure 14:
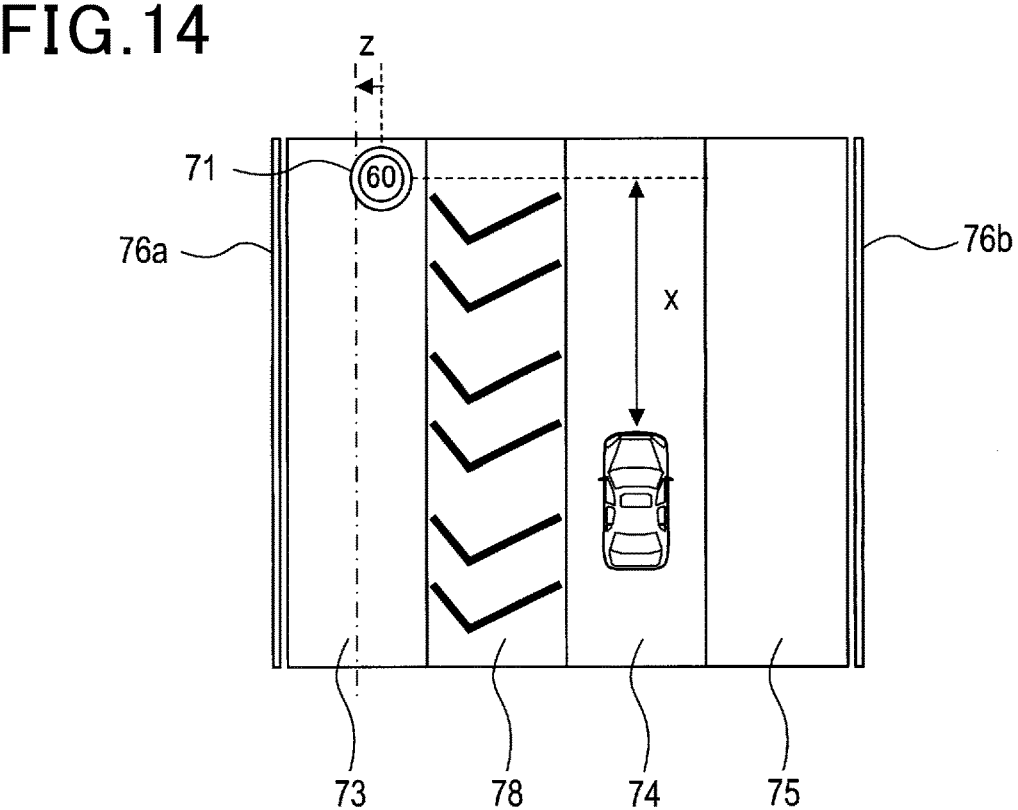
FIG. 14 is a diagram illustrating an exemplary longitudinal distance defined from an own vehicle to the traffic sign in the situation shown in FIG. 13 according to the third embodiment of the present disclosure.

By contrast, when the image recognizer 103 determines that the traffic sign has been detected in step S302 (Yes, in step S302), the process proceeds to step S303. Then, as shown in FIG. 14, the image recognizer 103 determines whether a longitudinal distance x measured from the own vehicle to the traffic sign in the longitudinal direction is more than a prescribed threshold. Here, the longitudinal distance x is calculated based on a coordinate of a center of gravity of the detection frame 72 of the traffic sign 71 in the longitudinal direction.

When the image recognizer 103 determines that the longitudinal distance x is less than a prescribed threshold, the process proceeds to step S304 and the image recognizer 103 determines that it is impossible to determine if the traffic sign is applicable to the own vehicle. That is, when a traffic sign is too close to the own vehicle and an image is captured therefrom, a demarcation line of the road disappears from an angle of view, thereby deteriorating an accuracy of recognizing an environment of the traffic sign.

By contrast, when the image recognizer 103 determines that the longitudinal distance x is above the threshold in step S303 (Yes, in step S303), the process proceeds to step S305 and the image recognizer 103 performs a recognition process of recognizing multiple traffic lanes including the own traffic lane as described earlier. For example, in a captured image shown in FIG. 13, three traffic lanes 73 to 75 has been recognized.

Figure 15:
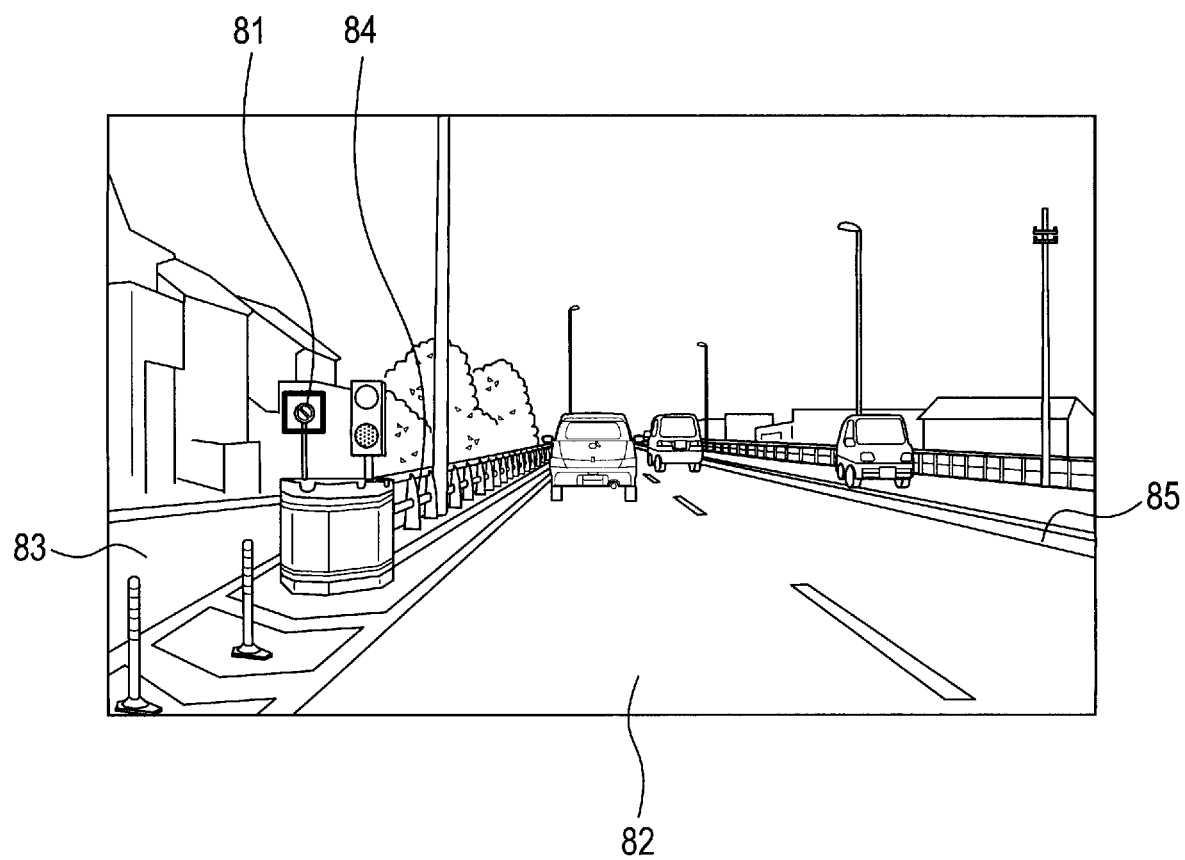
FIG. 15 is a diagram illustrating an exemplary situation in which a structure placed at a boundary between a main road and a side road is detected according to the third embodiment of the present disclosure.

Further, in step S305, the image recognizer 103 detects a three-dimensional object representing the road edge as described earlier. Specifically, the image recognizer 103 detects the closest three-dimensional objects respectively extending substantially parallel to the own traffic lane, which are positioned left and right of the own traffic lane. For example, in a captured image shown in FIG. 14, two sound insulation walls 76a and 76b installed at both edges of a road have been detected as three-dimensional objects. However, since a sound insulation wall 77 is only visible at a far edge boundary between traffic lanes 73 and 74, and is located far from the own vehicle, the sound insulation wall 77 is not detected as a three-dimensional object at this stage. For example, in a captured image shown in FIG. 15, a structure 84 installed at a boundary between a road to which the own traffic lane 82 belongs and a side road 83 arranged side by side with the road is detected as a three-dimensional object. Also detected as a three-dimensional object is a block 85 installed at a boundary between a side of the road to which the own traffic lane 82 belongs and an opposing traffic lane.

Figure 16:
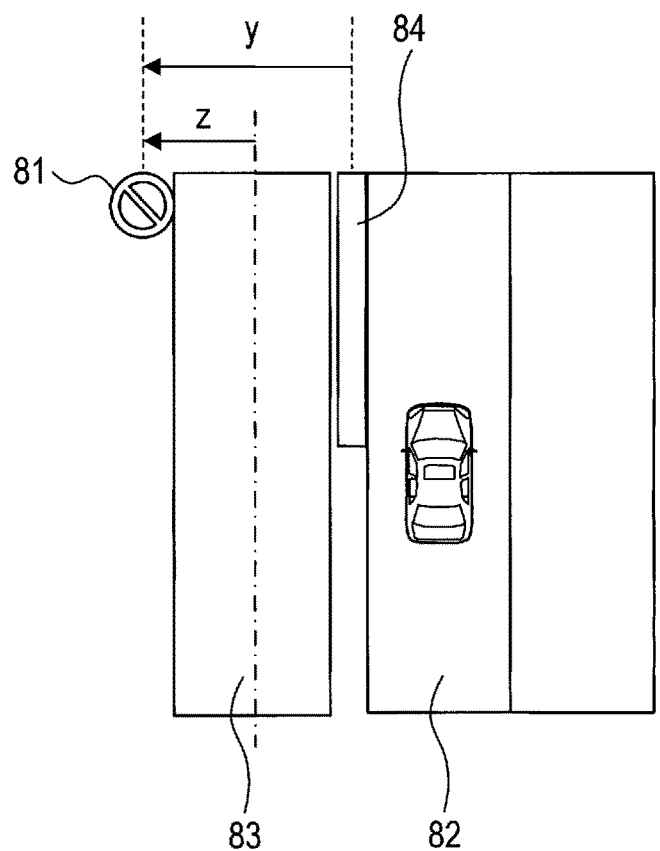
FIG. 16 is a diagram illustrating a distance from the structure placed at the boundary between the main road and the side road to a traffic sign in the situation shown in FIG. 15 according to the third embodiment of the present disclosure.

Subsequently, in step S306, the image recognizer 103 determines whether a distance y between the traffic sign and the three-dimensional object in a widthwise direction of the own vehicle (i.e., a direction separating from the own vehicle) is below a prescribed threshold. For example, in a captured image shown in FIG. 15, the lateral distance y is a distance defined from the structure 84 to the traffic sign 81 in the direction separating from the own vehicle as shown in FIG. 16.

In order to find the lateral distance y, first, as used in step S106 of the first embodiment, the image recognizer 103 uses a similar method and identifies corresponding points as a pair of corresponding points among points constituting the three-dimensional object (84), which is closest to a center of gravity of a detection frame surrounding of the traffic sign (81) in a longitudinal direction. Then, the image recognizer 103 calculates the lateral distance y based on coordinates of the center of gravity of the detection frame of the traffic sign (81) and the pair of-corresponding points in the widthwise direction of the own vehicle.

Figure 17:
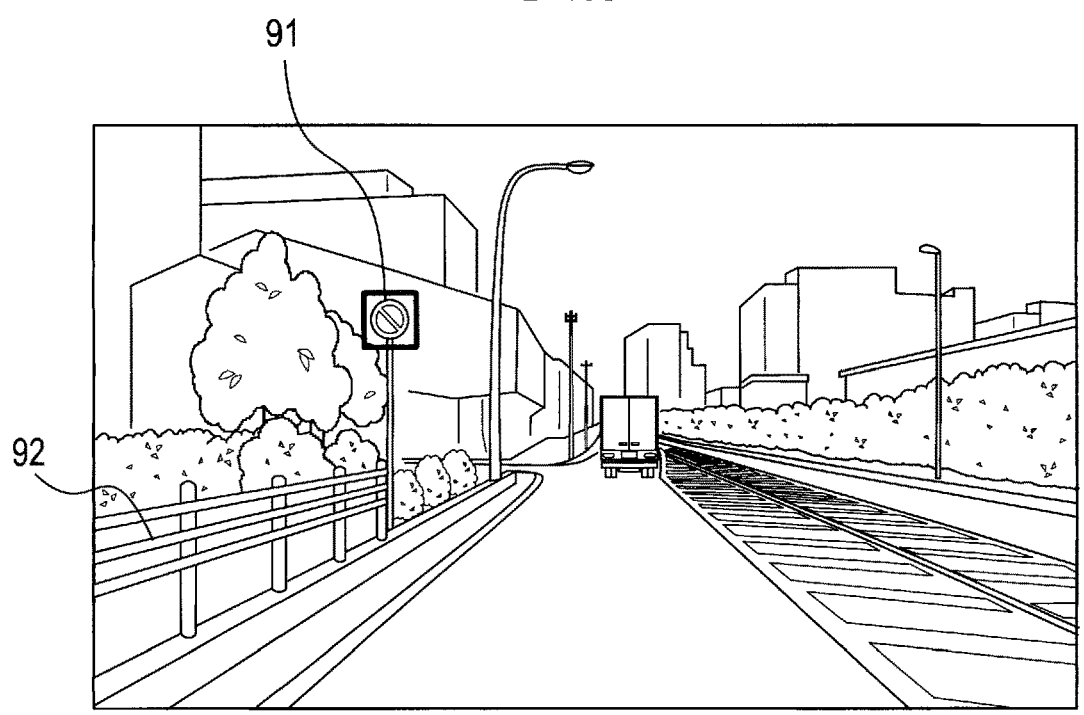
FIG. 17 is a diagram illustrating an exemplary situation where a traffic sign applicable to an own vehicle is detected according to the third embodiment of the present disclosure.
Figure 18:
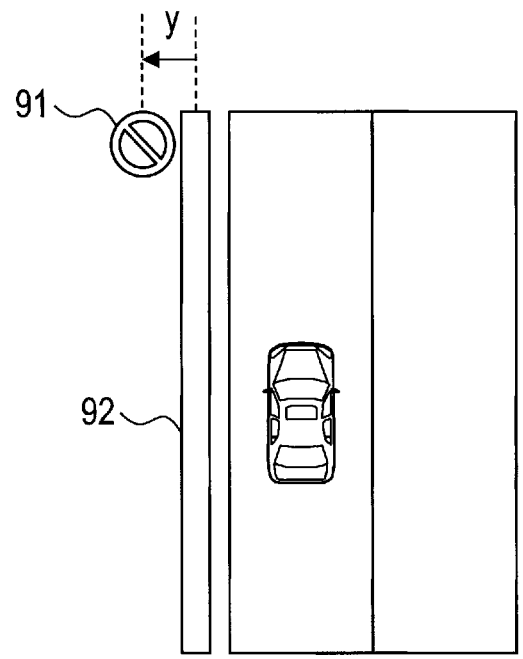
FIG. 18 is a diagram illustrating a distance from a guardrail placed at a boundary between a sidewalk and a driveway to a traffic sign in the situation shown in FIG. 17 according to the third embodiment of the present disclosure.

When the image recognizer 103 determines that the lateral distance y is greater than a prescribed threshold in step S306 (No, in step S306), the process proceeds to step S307 and the image recognizer 103 determines that the traffic sign as detected is not applicable to the own vehicle. That is, if the traffic sign is located significantly far from the three-dimensional object in the widthwise direction of the own vehicle, the traffic sign is highly likely to apply to another road to which the own traffic lane does not belong, such as a side road or the like that runs beside a road to which the own traffic lane belongs. For example, in a captured image shown in FIG. 17, a traffic sign 91 is disposed in an edge of the road to which the own traffic lane belongs, and is positioned substantially at the same position as a guardrail 92 acting as the three-dimensional object in the widthwise direction of the own vehicle as shown in FIG. 18. That is, the guardrail 92 is placed at a boundary between a driveway and a sidewalk as shown in FIG. 18. By contrast, in a captured image shown in FIG. 15, a traffic sign 81 is placed in a side road 83 considerably far from a structure 84 acting as the three-dimensional object placed at a boundary between a road to which the own traffic lane 82 belongs and the side road 83 as shown in FIG. 16. Hence, when the lateral distance y is greater than a prescribed threshold, and accordingly the traffic sign as detected is located significantly far from the three-dimensional object and the own vehicle in the widthwise direction of the own vehicle, the image recognizer 103 determines that the traffic sign is not applicable to the own vehicle.

Figure 13:
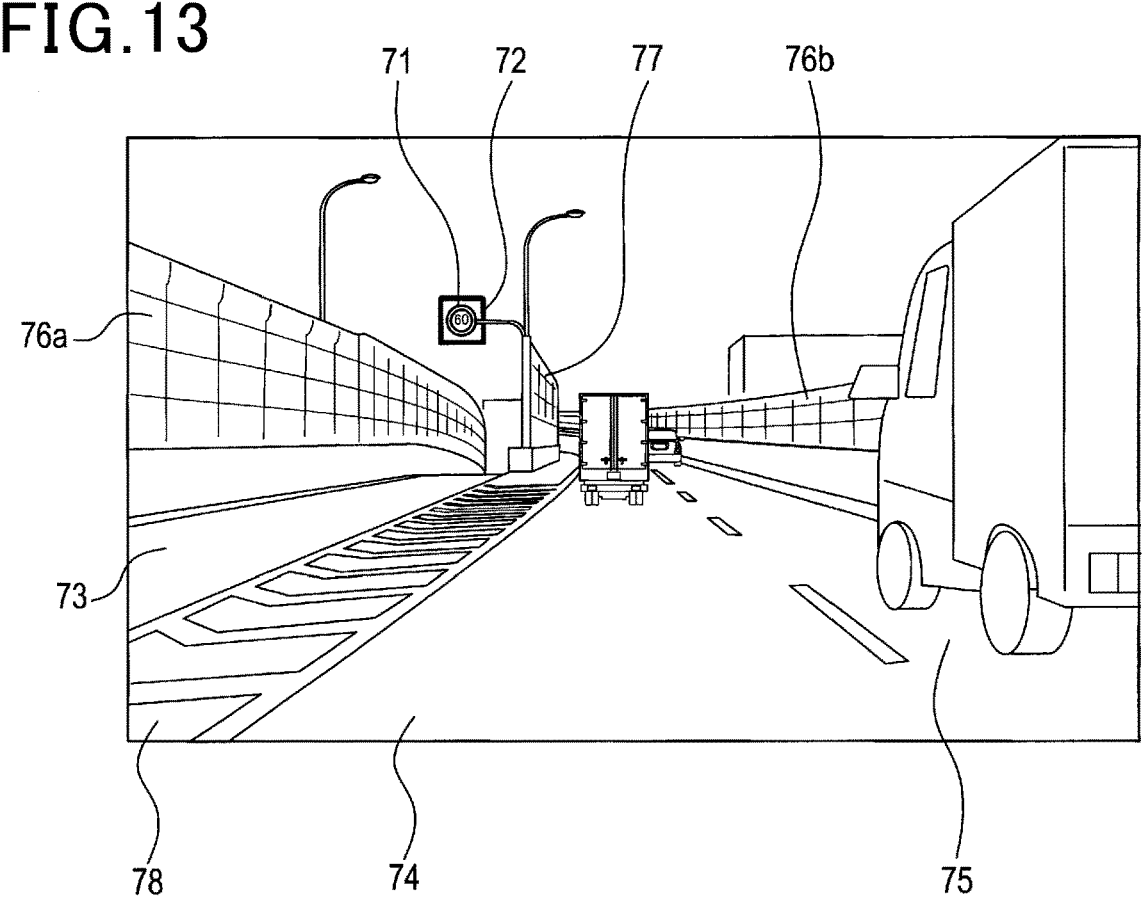
FIG. 13 illustrates a situation in which a traffic sign applicable to a traffic lane branching off from an own traffic lane is detected according to the third embodiment of the present disclosure.

By contrast, when the image recognizer 103 has determined that the lateral distance y is below the prescribed threshold in step S306 (Yes, in step S306), the process proceeds to step S308. Then, in step S308, the image recognizer 103 identifies a type of each of the multiple traffic lanes recognized in step S305. Specifically, the image recognizer 103 determines if each of the traffic lanes is the own traffic lane, a traffic lane that branches off from the own traffic lane, and a traffic lane that merges with the own traffic lane. The image recognizer 103 further determines if each of the traffic lanes is another traffic lane (for example, adjacent traffic lane adjacent to the own traffic lane). Here, the own traffic lane is recognized by recognizing a pair of demarcation lines that define the own traffic lane. Each other of the traffic lane that merges with the own traffic lane or the traffic lane branches off from the own traffic lanes is identified, for example, based on a presence or absence of a zebra band 78 as shown in FIG. 13 and a road shape or the like. The other traffic lane includes a traffic lane that extends forward from the own traffic lane and located beside the own traffic lane, such as an adjacent traffic lane adjacent to the own traffic lane, another traffic lane neighboring the adjacent traffic lane, etc. For example, in the captured image shown in FIG. 13, the image recognizer 103 recognizes that a traffic lane 73 is the traffic lane that branches off from the own traffic lane, a traffic lane 74 is the own traffic lane, and a traffic lane 75 is the adjacent traffic lane.

Subsequently, in step S309, the image recognizer 103 identifies a traffic lane closest to the traffic sign among the multiple traffic lanes. Specifically, first, the image recognizer 103 uses a similar method as used in a process performed in step S106 of the first embodiment and identifies a corresponding point among points constituting the centerline of each of the traffic lanes, which is closest in the longitudinal direction to a center of gravity of a detection frame surrounding of the traffic sign. The image recognizer 103 then compares of coordinates of corresponding points with a coordinate of the center of gravity of the detection frame of the traffic sign in the widthwise direction of the own vehicle, thereby identifying one of traffic lanes located closest to the traffic sign. For example, in the captured image shown in FIG. 13, the traffic lane 73 is identified as the closest traffic lane to the traffic sign 71.

Subsequently, in step S310, the image recognizer 103 determines whether a lateral distance z between the closest traffic lane to the traffic sign and the traffic sign in the widthwise direction of the own vehicle (i.e., in a direction separating from the own vehicle) is below a prescribed threshold. Here, like the calculation of the lateral distance y, the lateral distance z is similarly calculated based on the coordinate of the center of gravity of the detection frame surrounding of the traffic sign and a coordinate of the centerline of the closest traffic lane to the traffic sign in the widthwise direction of the own vehicle.

Figure 19:
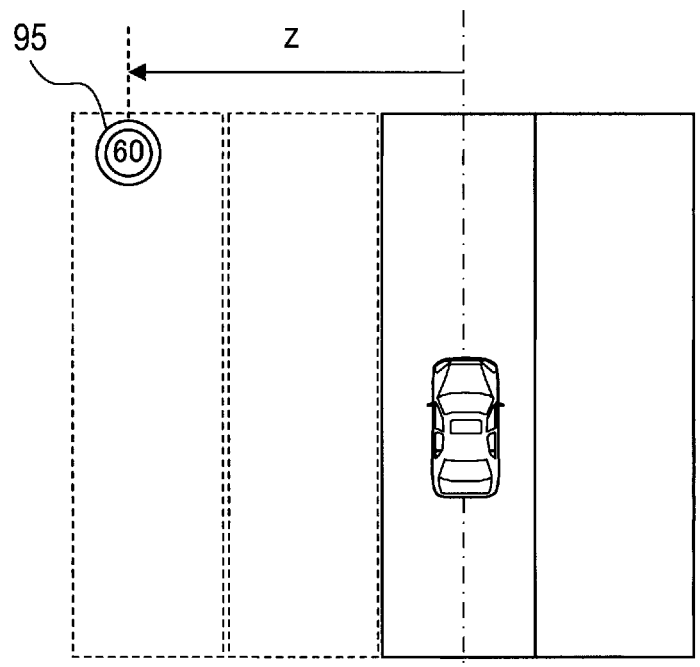
FIG. 19 a diagram illustrating a distance between a traffic sign and a traffic lane closest to the traffic sign in a situation where some of multiple traffic lanes arranged on one side of a road cannot be detected according to the third embodiment of the present disclosure.
Figure 20:
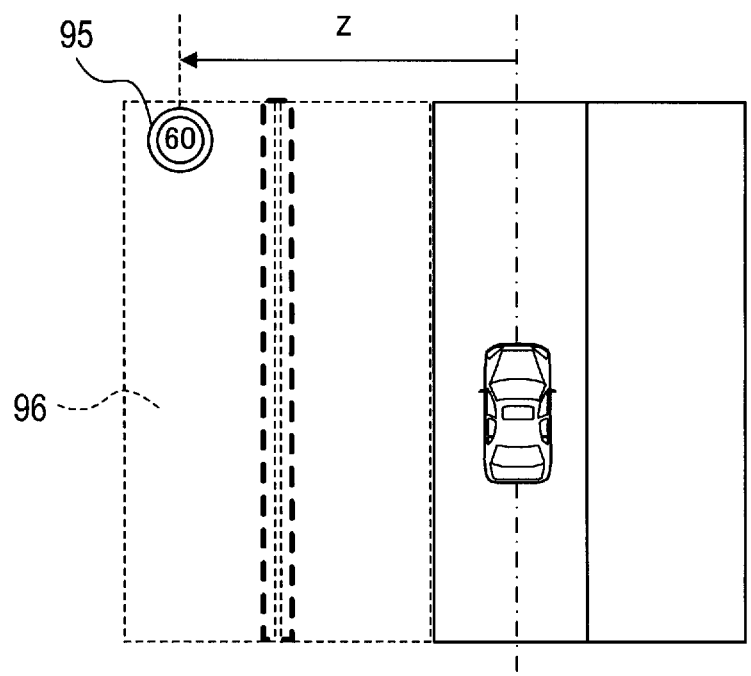
FIG. 20 is a diagram illustrating a distance between a traffic sign and a traffic lane closest to the traffic sign when some of multiple traffic lanes arranged on one side of a road and a three-dimensional object cannot be detected according to the third embodiment of the present disclosure.

When the image recognizer 103 determines that the lateral distance z is greater than a prescribed threshold in step S310 (No, in step S310), the process proceeds to step S304 and the image recognizer 103 determines that it is impossible if the traffic sign is applicable to the own vehicle. That is, for example, when the multiple traffic lanes and the three-dimensional object partially or wholly deviates from an angle of view when a front image is captured, for example, from a lower side or a left side of a captured image, the multiple traffic lanes and the three-dimensional object are not adequately detected even if the traffic sign has been detected. In such a situation, as shown in FIG. 19, it is not possible to determine whether a traffic sign 95 is applicable to the own vehicle even if the traffic sign 95 is placed at an end of a road with many traffic lanes on one side as shown in FIG. 19, or the traffic sign 95 does not apply to the own vehicle because the traffic sign 95 is placed in a side road 96 that runs beside a road to which an own traffic lane belongs as shown in FIG. 20. Hence, if the traffic sign is located significantly far away from the closest traffic lane to the traffic sign, the image recognizer 103 does not determine whether the traffic sign is applicable to the own vehicle.

By contrast, when the image recognizer 103 determines that the lateral distance z is below the prescribed threshold in step S310 (Yes, in step S310), the process proceeds to step S311 and the image recognizer 103 determines whether the traffic lane closest to the traffic sign is either a traffic lane that merges with the own traffic lane or a traffic lane that branches off from the own traffic lane.

When the image recognizer 103 determines in step S311 that the closest traffic lane to the traffic sign is a traffic lane that merges with the own traffic lane or a traffic lane that branches off from the own traffic lane (Yes, in step S311), the process proceeds to step S307 and the image recognizer 103 determines that the traffic sign is not applicable to the own vehicle. For example, in the captured image shown in FIG. 13, since the closest traffic lane 73 to the traffic sign 71 is a traffic lane that branches off from the own traffic lane, the traffic sign 71 is correctly determined that it does not apply to the own vehicle.

By contrast, when the image recognizer 103 has determined in step S311 that the closest traffic lane to the traffic sign is neither a traffic lane that merges with the own traffic lane nor a traffic lane that branches off from the own traffic lane, but is one of the own traffic lane and the other traffic lane, such as the adjacent traffic lane thereto, etc., the process proceeds to step S312. Then, in step S312, the image recognizer 103 determines that the traffic sign is applicable to the own vehicle.

Subsequently, the image recognizer 103 completes the traffic sign determination process of FIG. 12. Herein below, various advantages obtained in this embodiment will be described. First, based on the captured image, the image recognizer 103 identifies the closest traffic lane to the traffic sign as detected among the multiple traffic lanes, and determines whether the closest traffic lane to the traffic sign is a traffic lane that merges with the own traffic lane or a traffic lane that branches off from the own traffic lane. Then, the image recognizer 103 determines that the traffic sign is not applicable to the own vehicle when the closest traffic lane to the traffic sign is identified as a traffic lane that merges with the own traffic lane or a traffic lane that branches off from the own traffic lane.

According to such a configuration, information of a traffic sign placed for either a traffic lane that merges with the own traffic lane or a traffic lane that branches off from the own traffic lane can be appropriately excluded from information used in driving assistance given to the own vehicle.

Secondly, the image recognizer 103 determines that the traffic sign as detected does not apply to the own vehicle, regardless of whether the closest traffic lane to the traffic sign is identified as a traffic lane that merges with the own traffic lane or a traffic lane that branches off from the own traffic lane, if the traffic sign as detected is separated from the three-dimensional object representing the end of the road in the widthwise direction away from the own vehicle by more than a prescribed distance.

According to such a configuration, information on a traffic sign placed in another road different from a road in which the own vehicle travels, such as a side road, etc., can be appropriately excluded from information used in driving assistance given to the own vehicle.

Thirdly, the image recognizer 103 does not determine whether a traffic sign is applicable to the own vehicle if the traffic sign as detected is separated from the closest traffic lane by more than a prescribed distance in the widthwise direction away from the own vehicle. That is because, if the traffic sign as detected is placed significantly far away from the closest traffic lane thereto, multiple traffic lanes or three-dimensional objects, etc. placed around the traffic sign are highly unlikely to be properly detected. Hence, according to such a configuration, it is suppressed or reduced to erroneously determine whether the traffic sign as detected is applicable to the own vehicle.

In the third embodiment, the process performed in step S301 corresponds to the process performed by the traffic sign detector 41. The process performed in step S305 corresponds to the process performed by the traffic lane recognizer 42 and the three-dimensional object detector 45. Here, the process performed in step S309 corresponds to the process performed by the traffic lane specifying unit 43. The process performed in step S311 corresponds to the process performed by the confluence and branch identifier 44. The processes performed in steps S304, S307, and S312 collectively correspond to the process performed by the determiner 46.

Heretofore, the various embodiments of the present disclosure have been described. However, the present disclosure is not limited to the above-described embodiments and includes many variations as will be described herein below.

First, although in the above-described first embodiment, the image recognizer 101 detects a road marking indicated on a surface of a specific traffic lane on the road, markings detected by the image recognizer 101 are not limited thereto. For example, the road marking may be a traffic sign placed around the road, such as a traffic sign located above the road to indicate information applicable to a specific traffic lane.

Secondly, although in the above-described second embodiment, the degree of facing the own vehicle is calculated based on the length of the short axis relative to the length of the long axis of the ellipse when a form of the lit portion as extracted approximates the ellipse, the calculation method of the degree of facing the own vehicle is not limited thereto. For example, the degree of facing the own vehicle can be calculated by using a degree of circularity calculated based on a perimeter length and an area of the lit portion or a ratio of an area occupied by the lit portion to that of an external circle of the lit portion, and the like. Further, instead of using the above-described calculation of calculating the degree of facing the own vehicle based on a closeness of the shape of the lit portion of the traffic signal to a shape of a lit portion of the traffic signal when a front of the traffic signal faces the own vehicle, the degree of facing the own vehicle can be calculated based on a ratio of an area occupied by a lit portion to an area occupied by the detection frame provided to the traffic signal in the captured image of or the like. Further, the degree of facing the own vehicle can be calculated by comparing either a shape of the lit portion or a characteristic of a shape of the detection frame provided to the traffic signal with past instances stored in a database. Further, such calculation can be performed by using a model constructed by machine learning.

Thirdly, in the above-described second embodiment, the image recognizer 102 identifies the traffic signal with the greater degree of facing the own vehicle among the multiple traffic signals as a traffic signal applicable to the own vehicle. However, the image recognizer 102 can simply determine that a traffic signal as detected is applicable to the own vehicle when the degree of facing the own vehicle of the traffic signal as detected is a prescribed threshold or more.

Fourthly, in the above-described first to third embodiments, although each of the image recognizers 101 to 103 outputs the determination result per input of a single captured image from the image capturing unit 11, a determination is made multiple times per image captured at a prescribed interval and a final determination result can be output based on a majority rule-Fifthly, the function of a single component employed in each of the above-described embodiments can be distributed to multiple components. By contrast, the function performed by multiple components can be performed only by a single component. Further, a part of the configuration of each of the above-described embodiments can be omitted. Further, at least a part of the configuration of each of the above-described embodiments can be added to or replaced with a corresponding part of the configuration of the other embodiment.

Sixthly, a method for realizing the above-described functions of portions included in each of the image recognizers 101 to 103 is not limited to a method performed based on software. That is, the functions thereof can be realized by partially or wholly using one or more hardware. For example, if the above-described function is realized by an electronic circuit as hardware, the electronic circuit can be realized by one of a digital circuit, an analog circuit, and a combination of these circuits.

Seventhly, in addition to the image recognizers 101 to 103 as described above, the present disclosure can be realized by various categories, such as a system including one of the image recognizers 101 to 103 as a component, program for configuring a computer to function as one of the image recognizers 101 to 103, a non-transitory tangible computer-readable storage medium having the program recorded therein, an image recognition method, etc.

Numerous additional modifications and variations of the present disclosure are possible in light of the above teachings. It is therefore to be understood that within the scope of the appended claims, the present disclosure may be performed otherwise than as specifically described herein. For example, the present disclosure is not limited to the above-described image recognition system and may be altered as appropriate. Further, the present disclosure is not limited to the above-described image recognition method and may be altered as appropriate.

What is claimed is:

1. An image recognition system for calculating a degree by which a traffic signal faces an own vehicle comprising:
    a traffic signal detector configured to detect the traffic signal based on an image of a region in front of the own vehicle captured from the own vehicle;
    a calculator configured to calculate a degree by which a front of the traffic signal faces the own vehicle, based on the image; and
    a traffic signal identifier configured to identify a traffic signal applicable to the own vehicle based on the degree,
    wherein
    the calculator calculates the degree by which the front of the traffic signal faces the own vehicle based on:
    measuring a first length of an illuminated portion of the traffic signal along a major axis of the illuminated portion;
    measuring a second length of the illuminated portion along a minor axis of the illuminated portion;
    determining a ratio of the second length versus the first length; and
    wherein
    the degree by which the front of the traffic signal faces the own vehicle increases the closer the ratio is to a ratio of 1:1.

2. The image recognition system as claimed in claim 1, wherein the calculator calculates the degree by comparing a current shape of a lit portion of the traffic signal to a shape of the lit portion appearing when a front of the traffic signal precisely faces the own vehicle.

3. The image recognition system as claimed in claim 1, wherein the traffic signal detector is enabled to detect multiple traffic signals, the calculator calculates the degree per traffic signal, and the traffic signal identifier identifies a traffic signal with the greatest degree among the multiple traffic signals as a traffic signal applicable to the own vehicle.

4. The image recognition system as claimed in claim 3, further comprising a region recognizer to recognize an own traffic lane region based on the image, the own traffic lane region corresponding to an own traffic lane in which the own vehicle travels;
    wherein the traffic signal identifier identifies the traffic signal applicable to the own vehicle based on the degree on condition that either a traffic signal is absent or two or more traffic signals are present in the own traffic lane region.

5. The image recognition system as claimed in claim 3, wherein the traffic signal identifier identifies the traffic signal applicable to the own vehicle based on the degree on condition that lit colors of the multiple traffic signals are different from each other.

* * * * *